(12) United States Patent
Reimchen

(10) Patent No.: US 11,906,004 B2
(45) Date of Patent: Feb. 20, 2024

(54) FREEWHEEL ASSEMBLY HAVING A DEEP-DRAWN FLANGE

(71) Applicant: Schaeffler Technologies AG & Co. KG, Herzogenaurach (DE)

(72) Inventor: Alexander Reimchen, Herzogenaurach (DE)

(*) Notice: Subject to any disclaimer, the term of this patent is extended or adjusted under 35 U.S.C. 154(b) by 43 days.

(21) Appl. No.: 17/636,386

(22) PCT Filed: Aug. 13, 2020

(86) PCT No.: PCT/DE2020/100701
§ 371 (c)(1),
(2) Date: Feb. 18, 2022

(87) PCT Pub. No.: WO2021/052527
PCT Pub. Date: Mar. 25, 2021

(65) Prior Publication Data
US 2022/0268325 A1    Aug. 25, 2022

(30) Foreign Application Priority Data
Sep. 17, 2019  (DE) ...................... 10 2019 124 927.9

(51) Int. Cl.
*F16D 41/066* (2006.01)

(52) U.S. Cl.
CPC .... *F16D 41/066* (2013.01); *F16D 2250/0023* (2013.01); *F16D 2300/12* (2013.01)

(58) Field of Classification Search
CPC ........... F16D 41/066; F16D 2041/0665; F16D 41/067; F02N 15/023
USPC ........................................................... 192/42
See application file for complete search history.

(56) References Cited

U.S. PATENT DOCUMENTS

| | | | |
|---|---|---|---|
| 3,528,534 A * | 9/1970 | Benson | F16D 41/067 188/82.84 |
| 2014/0231206 A1* | 8/2014 | Altmann | F16D 41/00 192/45.001 |
| 2016/0017936 A1* | 1/2016 | Reimchen | F16D 41/067 192/45.004 |

FOREIGN PATENT DOCUMENTS

| | | | |
|---|---|---|---|
| DE | 3739220 C2 | 6/1994 | |
| DE | 102008021960 A1 * | 11/2009 | ............ F16D 41/06 |
| DE | 102014204174 A1 | 9/2015 | |
| DE | 102014209119 A1 | 11/2015 | |
| DE | 102016218714 B4 | 5/2018 | |
| DE | 102017127528 A1 | 11/2018 | |
| WO | 2013053505 A1 | 4/2013 | |

* cited by examiner

*Primary Examiner* — Richard M Lorence

(57) ABSTRACT

A freewheel assembly includes a central axis of rotation, a single-piece flange formed by deep drawing, and a freewheel unit. The single-piece flange includes a sleeve portion, a disk portion protruding radially outward from the sleeve portion, and a centering collar. The disk portion includes a first end face and the centering collar is formed on the first end face. The freewheel unit includes an outer ring fastened to the sleeve portion by press fitting, and a plurality of rolling elements accommodated within the outer ring. The outer ring includes a plurality of clamping ramps, and each one of the plurality of rolling elements cooperates with a one of the plurality of clamping ramps.

11 Claims, 5 Drawing Sheets

FREEWHEEL ASSEMBLY HAVING A DEEP-DRAWN FLANGE

CROSS-REFERENCE TO RELATED APPLICATIONS

This application is the United States National Phase of PCT Appln. No. PCT/DE2020/100701 filed Aug. 13, 2020, which claims priority to German Application No. DE102019124927.9 filed Sep. 17, 2019, the entire disclosures of which are incorporated by reference herein.

TECHNICAL FIELD

The present disclosure relates to a freewheel assembly, which may be used in a torque transmission device having an electric starter motor or in a transmission, e.g., in a motor vehicle such as a motorcycle, having a single-piece flange formed by deep drawing and an outer ring, as well as several rolling bodies accommodated within the outer ring freewheel unit which cooperate with clamping ramps of the outer ring. The outer ring is fastened in a sleeve portion of the flange via a press fit.

BACKGROUND

Generic freewheel assemblies are already known in the prior art. For example, DE 10 2016 218 714 B4 discloses a freewheel assembly having a freewheel and a flange.

A disadvantage of the designs known from the prior art is that, when these freewheel assemblies are installed by the customer, there is often a relatively high effort in connecting these freewheel assemblies to further components.

SUMMARY

The present disclosure provides a centering collar foil led on an end face of a disk portion of the flange that projects radially outward from the sleeve portion. A centering collar is understood to be a projection which protrudes axially from the flange/disk portion and which forms a radial bearing surface/centering surface.

This centering collar simplifies further assembly, while the flange can still be produced simply by deep drawing.

Accordingly, the centering collar may be formed by a projection formed by deep-drawing technology. In this way the manufacturing effort is further simplified.

For simple assembly and a simple design of the further components that can be connected to the flange, the centering collar may form an annular/completely circumferential bearing surface pointing radially outward.

If multiple through holes distributed in the circumferential direction are made in the disk portion radially outside the centering collar, good accessibility is enabled for the assembly of the freewheel assembly, for example via a screw connection.

For a compact axial design, the outer ring may have the same length (axial extent) as the sleeve portion.

A circumferential groove may be impressed on a second end face (of the disk portion) facing away from the first end face having the centering collar.

The sleeve portion may have an outer diameter which is smaller than an outer diameter of the centering collar.

If the groove is arranged at the same radial height as the centering collar, the disk portion can be implemented in a compact manner both axially and radially.

Furthermore, the disk portion may be arranged to be eccentric to the sleeve portion, as seen in an axial direction.

In this context, the sleeve portion and the disk portion may be arranged relative to one another in such a way that the flange as a whole has an (essentially) L-shaped cross-sectional area.

In other words, according to the present disclosure, a sleeve freewheel (freewheel unit) combined with a drawn flange is implemented. The deep-drawn flange is connected by means of a press fit.

BRIEF DESCRIPTION OF THE DRAWINGS

In the following, the present disclosure is now explained in more detail with reference to figures.

In the figures.

DETAILED DESCRIPTION

The figures are only schematic in nature and serve only for understanding the disclosure. The same elements are provided with the same reference symbols.

Figure 1:
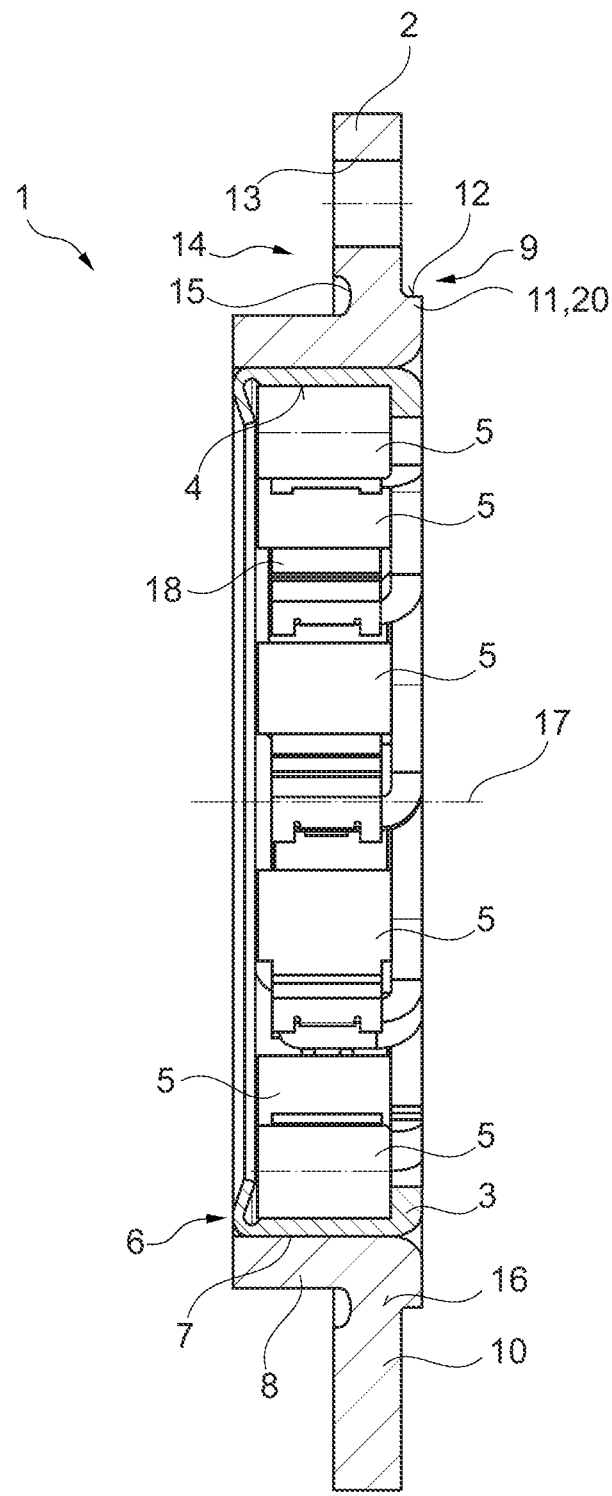
FIG. 1 shows a longitudinal sectional view of a freewheel assembly according to an exemplary embodiment.
Figure 2:
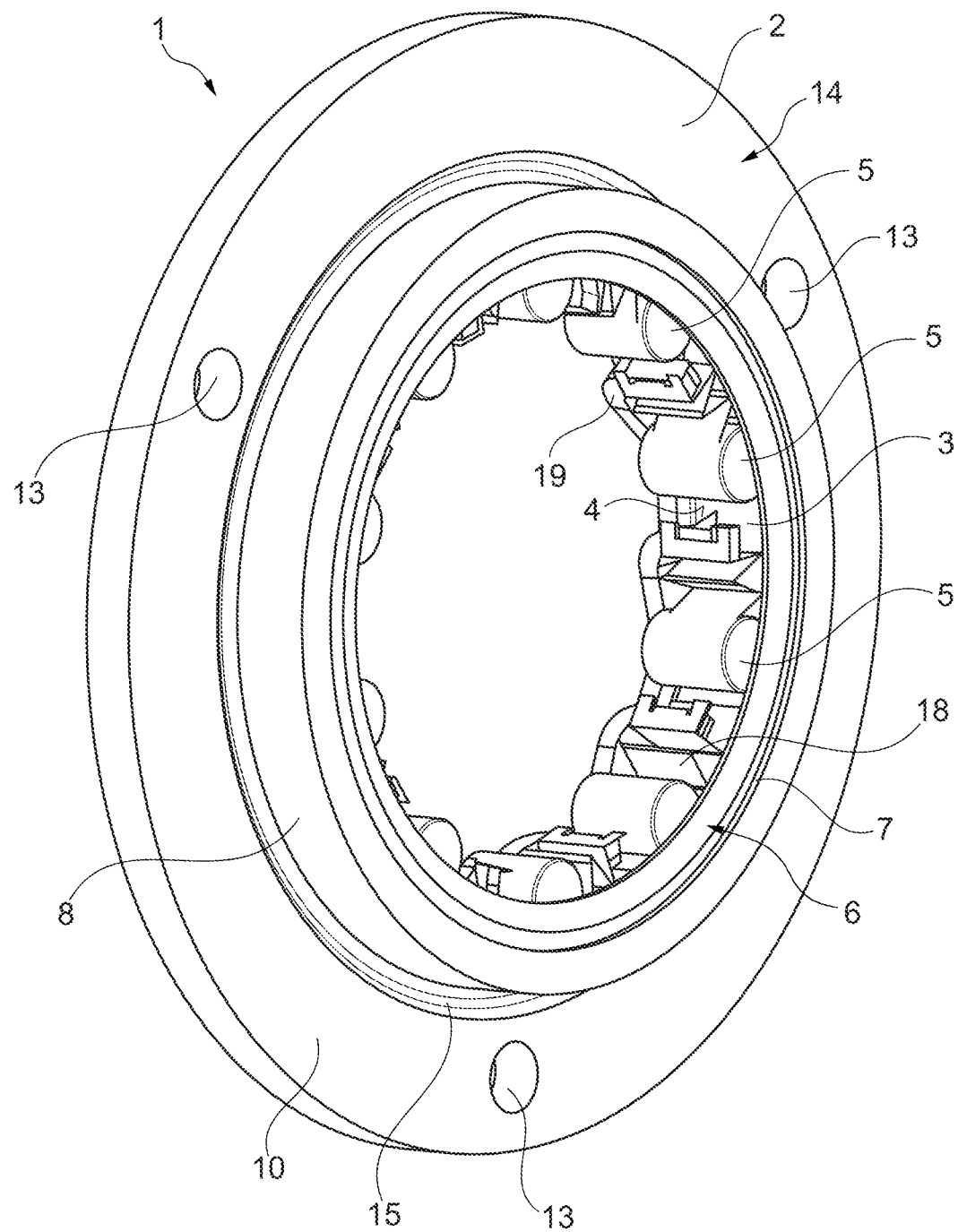
FIG. 2 shows a perspective illustration of the freewheel assembly in a full view from an end face facing away from a centering collar.

The freewheel assembly 1 according to the disclosure, illustrated in terms of the structure thereof with FIG. 1, has a single-piece flange 2 which firmly receives a freewheel unit 6 on the radial inside thereof. The freewheel assembly 1 may be used in a torque transmission device of a motorcycle that has an electric starter motor. In further embodiments, the freewheel assembly 1 may also be used in other areas of a motor vehicle, such as, for example, in a transmission.

The freewheel assembly 1 has a central axis of rotation 17, as shown in FIG. 1. The directions used below, axially, radially and in the circumferential direction, relate to this axis of rotation 17. Consequently, axially/an axial direction is a direction along the axis of rotation 17, radially/a radial direction is a direction perpendicular to the axis of rotation 17, and a circumferential direction is a direction along a circular line that runs coaxially around the axis of rotation 17.

Figure 4:
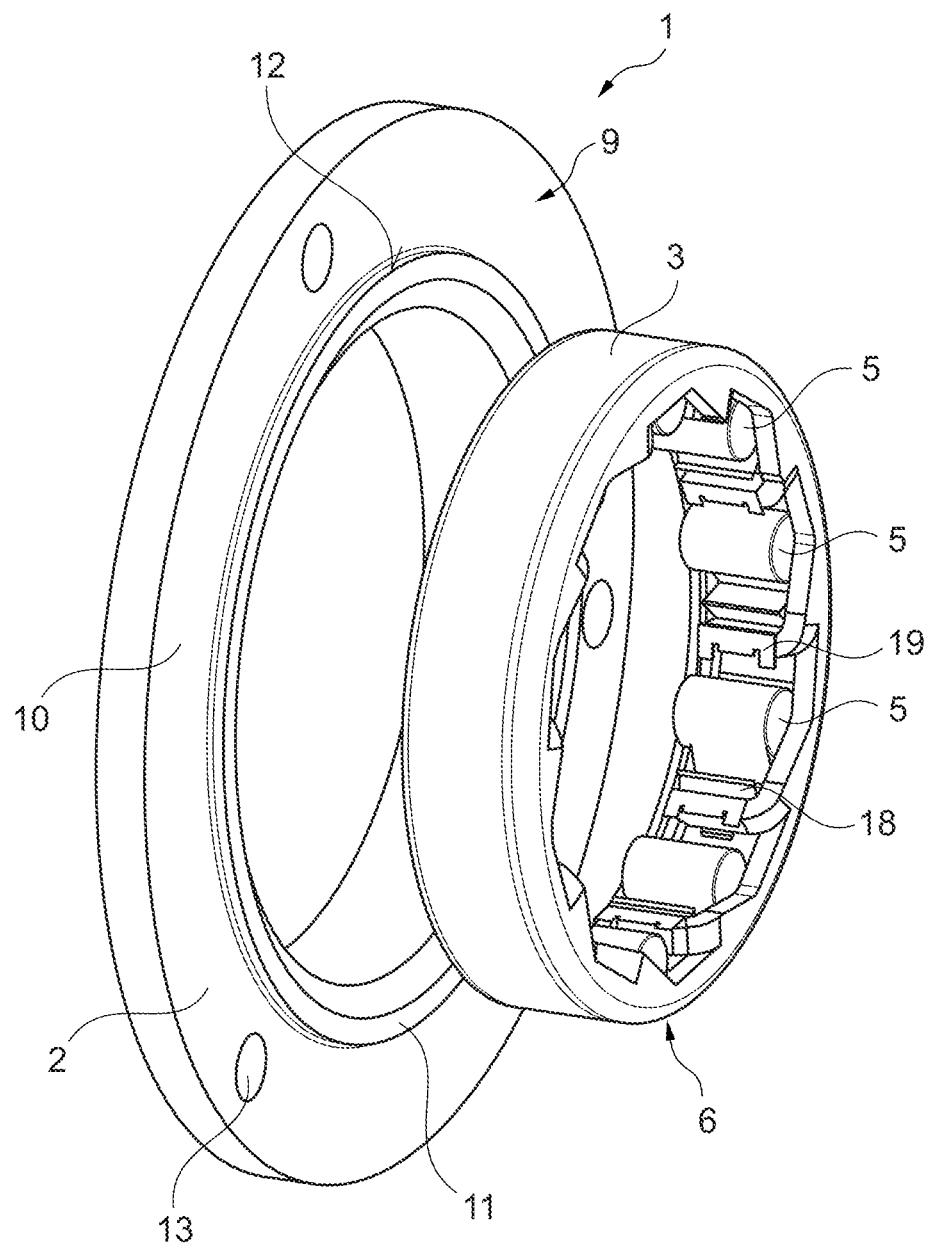
FIG. 4 shows a partially exploded view of the freewheel assembly, wherein a freewheel unit has an outer ring and multiple rolling elements not yet being pressed into a flange.
Figure 5:
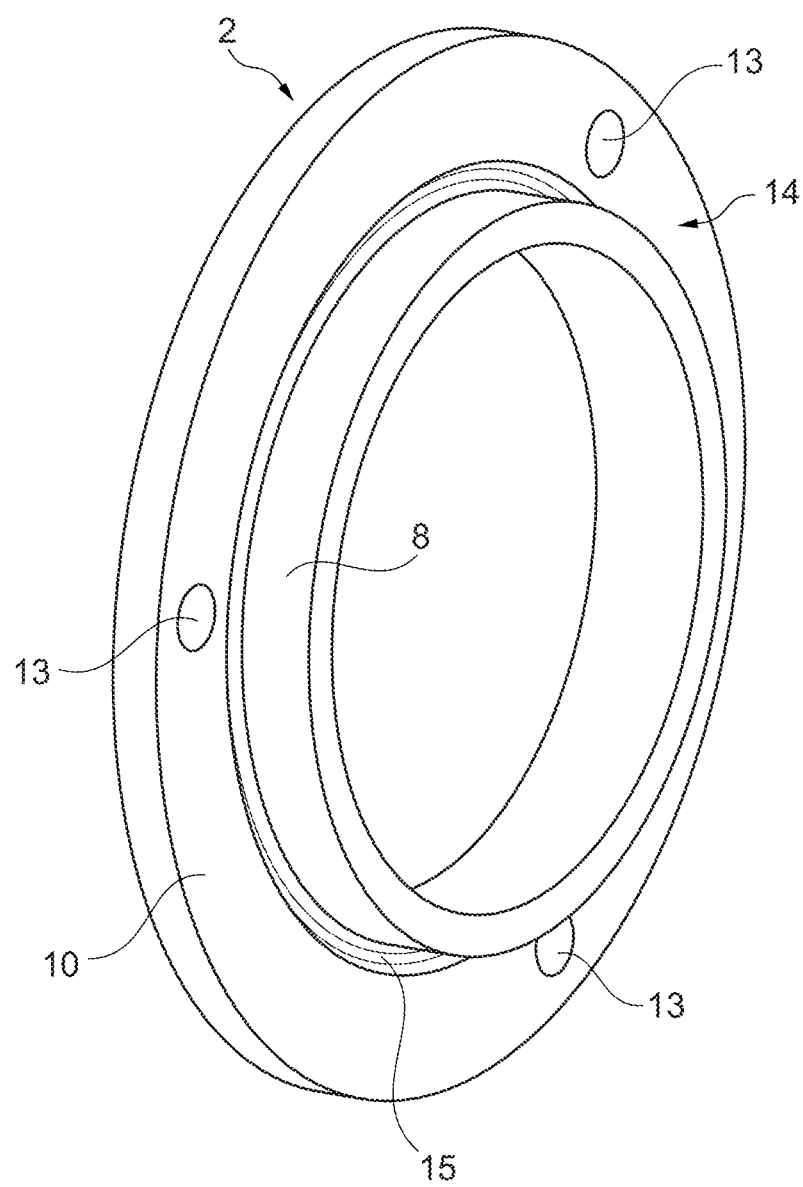
FIG. 5 shows a perspective view how the flange is used as shown in FIGS. 1 to 4.

As can be seen in FIGS. 1 and 4, the freewheel unit 6 has an outer ring 3. The outer ring 3 directly forms multiple clamping ramps 4 on the radial inside thereof, which are offset from one another in the circumferential direction with each interacting with a rolling element 5. The rolling elements 5 cooperate with the clamping ramps 4 in the sense of a freewheel locking in one direction of rotation, in the form of a sleeve freewheel. The rolling elements 5 are implemented as rollers, but can also be implemented in other ways in further embodiments. The rolling elements 5 are each pre-stressed in a circumferential direction via corresponding springs 18. The rolling elements 5 are also guided by means of a cage 19.

As shown in FIG. 1, in the fully assembled state of the freewheel assembly 1, the outer ring 3 is pressed into a sleeve portion 8 of the flange 2, i.e., fixed by means of a press fit 7. In this embodiment it becomes clear that the outer ring 3 has the same axial extent/length as the sleeve portion 8. The sleeve portion 8 runs in the axial direction.

As can also be seen in connection with FIGS. 2 to 5, a disk portion 10 of the flange 2 extends from the sleeve portion 8 immediately radially outward. This disk portion 10, together with the sleeve portion 8, forms an essentially L-shaped cross-sectional area 16. The disk portion 10 is consequently offset with respect to an axial center of the sleeve portion 8, that is to say, is arranged eccentrically to the sleeve portion 8. The disk portion 10 forms a typical flange area which is provided with axial through holes 13 which are arranged to be offset from one another in the circumferential direction. Via the through holes 13, the flange 2 can be attached to a corresponding component in an assembled position using fastening means, e.g., screws.

Figure 3:
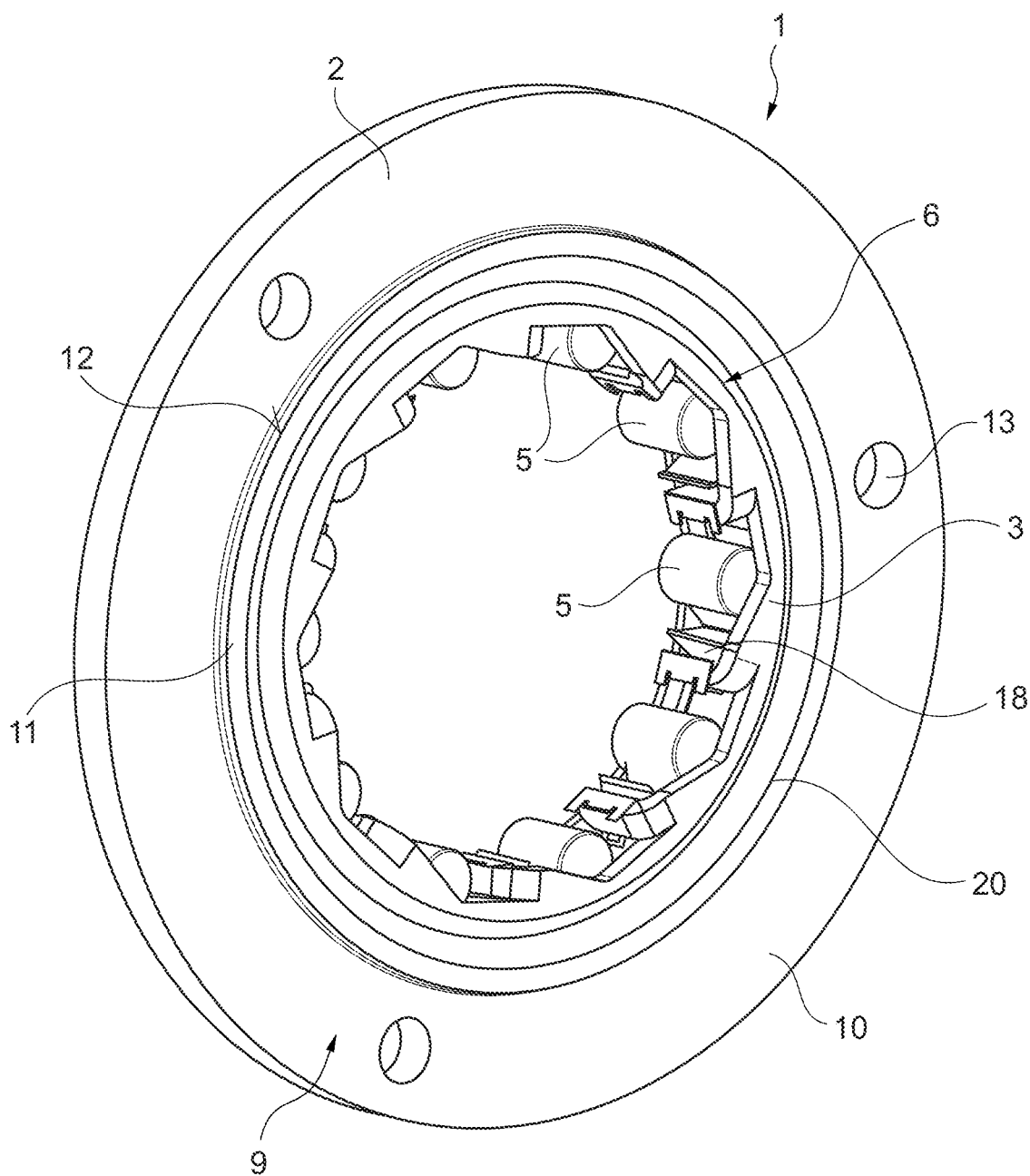
FIG. 3 shows a perspective illustration of the freewheel assembly from an end face having the centering collar.

According to the disclosure, a centering collar 11 is formed directly on a (first) end face 9 of the disk portion 10. This centering collar 11, as can be seen, for example, in FIG. 3, is realized by an annular projection 20 on the first end face 9 that extends completely around the circumference and projects axially. The centering collar 11 has an annular bearing surface 12 pointing radially outward, on which the corresponding counterpart of the further component of the motor vehicle rests during operation. The centering collar 11 runs concentrically to the axis of rotation 17. The centering collar 11 is arranged with the bearing surface 12 thereof, viewed in the radial direction, between the sleeve portion 8 and the through holes 13. In particular, the centering collar 11 has an outer diameter that is greater than an outer diameter of the sleeve portion 8 (on a second end 14 facing away from the first end face 9), but is arranged radially inside the through holes 13. On the second end face 14, an axial recess in the form of a circumferential groove 15 is also formed in the disk portion 10. The groove 15 is at the same radial height as the centering collar 11.

The flange 2 is realized as a deep-drawn element, and the disk portion 10, the sleeve portion 8 and the centering collar 11 and the groove 15, for example, are formed together in a deep-drawing step, i.e., by means of a tool, in a deep-drawing process.

In other words, according to the disclosure, a deep-drawn flange 2 is provided in combination with a sleeve freewheel 6 (FRAX freewheel). The L-shaped flange 2 having a centering collar 11 molded onto the rear side 9 is connected to the FRAX freewheel 6 by means of a press fit 7. At the end customer, the flange 2 is then attached to a housing with screws.

REFERENCE NUMERALS

1 Freewheel assembly
2 Flange
3 Outer ring
4 Clamping wedge
5 Roller body
6 FreeWheel unit
7 Press fir
8 Sleeve portion
9 First end face
10 Disk portion
11 Centering collar
12 Bearing surface
13 Through hole
14 Second end face
15 Groove
16 Cross-sectional area
17 Axis of rotation
18 Spring
19 Cage

The invention claimed is:

1. A freewheel assembly comprising:
a central axis of rotation;
a single-piece flange formed by deep-drawing, the single-piece flange comprising:
a sleeve portion;
a disk portion protruding radially outward from the sleeve portion, the disk portion comprising a first end face; and
a centering collar formed on the first end face, the centering collar forming a bearing surface pointing radially outward;
a freewheel unit comprising:
an outer ring fastened to the sleeve portion by press fitting, the outer ring comprising a plurality of clamping ramps; and
a plurality of rolling elements accommodated within the outer ring, each one of the plurality of rolling elements cooperating with a one of the plurality of clamping ramps.

2. The freewheel assembly of claim 1, wherein the disk portion comprises a plurality of through holes circumferentially distributed radially outside of the centering collar.

3. The freewheel assembly of claim 1 an outer ring axial length equals a sleeve portion axial length.

4. The freewheel assembly of claim 1 wherein the single-piece flange further comprises:
a second end face facing away from the first end face; and
a circumferential groove impressed on the second end face.

5. The freewheel assembly of claim 4, wherein the circumferential groove is arranged at a same radial height as the centering collar.

6. The freewheel assembly of claim 1, wherein a sleeve portion outer diameter is smaller than a centering collar outer diameter.

7. The freewheel assembly of claim 1, wherein the disk portion is arranged to be eccentric to the sleeve portion when viewed in an axial direction.

8. The freewheel assembly of claim 1 wherein the sleeve portion and the disk portion are arranged relative to one another in such a way that the single-piece flange has an L-shaped cross-sectional area.

9. A freewheel assembly comprising:
a central axis of rotation;
a single-piece flange formed by deep-drawing, the single-piece flange comprising:
a sleeve portion;
a disk portion protruding radially outward from the sleeve portion, the disk portion comprising a first end face;
a centering collar formed on the first end face;
a second end face facing away from the first end face; and
a circumferential groove impressed on the second end face;
a freewheel unit comprising:
an outer ring fastened to the sleeve portion by press fitting, the outer ring comprising a plurality of clamping ramps; and a plurality of rolling elements accommodated within the outer ring, each one of the plurality of rolling elements cooperating with a one of the plurality of clamping ramps.

10. The freewheel assembly of claim 9, wherein the circumferential groove is arranged at a same radial height as the centering collar.

11. A freewheel assembly comprising:
a central axis of rotation;
a single-piece flange formed by deep-drawing, the single-piece flange comprising:
 a sleeve portion;
 a disk portion protruding radially outward from the sleeve portion, the disk portion comprising a first end face; and
 a centering collar formed on the first end face;
a freewheel unit comprising:
 an outer ring fastened to the sleeve portion by press fitting, the outer ring comprising a plurality of clamping ramps; and
 a plurality of rolling elements accommodated within the outer ring, each one of the plurality of rolling elements cooperating with a one of the plurality of clamping ramps, wherein a sleeve portion outer diameter is smaller than a centering collar outer diameter.

* * * * *